(12) United States Patent
Kim et al.

(10) Patent No.: US 12,342,149 B2
(45) Date of Patent: Jun. 24, 2025

(54) METHOD AND APPARATUS WITH ABNORMAL CHANNEL OF MICROPHONE ARRAY DETECTION AND COMPENSATION SIGNAL GENERATION

(71) Applicants: Samsung Electronics Co., Ltd., Suwon-si (KR); Seoul National University R&DB Foundation, Seoul (KR)

(72) Inventors: Nam Soo Kim, Seoul (KR); Ji Won Yoon, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 369 days.

(21) Appl. No.: 17/689,299

(22) Filed: Mar. 8, 2022

(65) Prior Publication Data
US 2023/0104123 A1    Apr. 6, 2023

(30) Foreign Application Priority Data
Oct. 6, 2021    (KR) .................. 10-2021-0132102

(51) Int. Cl.
*H04R 5/027*    (2006.01)
*G10L 15/02*    (2006.01)
(Continued)

(52) U.S. Cl.
CPC .............. *H04S 7/30* (2013.01); *G10L 19/008* (2013.01); *G10L 19/24* (2013.01); *H04R 3/005* (2013.01);
(Continued)

(58) Field of Classification Search
CPC ........ H04S 7/30; H04S 3/008; H04S 2400/01; H04S 2400/15; H04R 3/005; H04R 5/027;
(Continued)

(56) References Cited

U.S. PATENT DOCUMENTS

| 10,405,115 B1 | 9/2019 | Landron et al. |
| 10,959,029 B2 * | 3/2021 | Soto ..................... H04R 29/005 |

(Continued)

FOREIGN PATENT DOCUMENTS

| CN | 206931362 U | * | 1/2018 | ............. G10L 15/02 |
| CN | 110798790 A | * | 2/2020 | ............. G06F 18/22 |

(Continued)

OTHER PUBLICATIONS

Harsh Purohit, Ryo Tanabe, Kenji Ichige, Takashi Endo, Yuki Nikaido, Kaori Suefusa, and Yohei Kawaguchi, MIMII Dataset: Sound Dataset for Malfunctioning Industrial Machine Investigation and Inspection, arXiv:1909.09347, https://doi.org/10.48550/arXiv.1909.09347, Sep. 20, 2019 (Year: 2019).*

(Continued)

*Primary Examiner* — Paras D Shah
*Assistant Examiner* — Mulugeta Tuji Dugda
(74) *Attorney, Agent, or Firm* — NSIP Law (57) ABSTRACT

Method and apparatus for detecting abnormal channel of microphone array detection and generating compensation signal are provided. A method includes receiving multi-channel sound source signals from a microphone array, synchronizing the multi-channel sound source signals based on spatial information of the microphone array, and detecting an abnormal channel of the microphone array by inputting the synchronized sound source signals and first conditional information to a neural network model configured to perform an inverse operation. The method further includes (Continued)

generating a compensation signal corresponding to an abnormal channel using a neural network model in response to an abnormal channel being detected.

23 Claims, 8 Drawing Sheets (51) Int. Cl.
*G10L 19/008* (2013.01)
*G10L 19/24* (2013.01)
*H04R 3/00* (2006.01)
*H04S 3/00* (2006.01)
*H04S 7/00* (2006.01)

(52) U.S. Cl.
CPC ............ *H04R 5/027* (2013.01); *H04S 3/008* (2013.01); *G10L 15/02* (2013.01); *H04S 2400/01* (2013.01); *H04S 2400/15* (2013.01)

(58) Field of Classification Search
CPC .............. H04R 2201/401; H04R 1/406; H04R 29/005; H04R 5/04; G10L 19/008; G10L 15/02
See application file for complete search history.

(56) References Cited

U.S. PATENT DOCUMENTS

| | | |
|---|---|---|
| 2017/0127180 A1 | 5/2017 | Shields et al. |
| 2017/0188138 A1 | 6/2017 | Makinen et al. |
| 2019/0043491 A1 | 2/2019 | Kupryjanow et al. |
| 2020/0328789 A1 | 10/2020 | Pritsker et al. |
| 2020/0366994 A1 | 11/2020 | Arteaga et al. |

FOREIGN PATENT DOCUMENTS

| | | | | |
|---|---|---|---|---|
| CN | 112348052 A | * | 2/2021 | ............... G06F 8/51 |
| JP | 2017090606 A | * | 5/2017 | ............... G06F 3/16 |
| JP | 2019-200091 A | | 11/2019 | |
| KR | 10-1015102 B1 | | 2/2011 | |
| KR | 10-2017-0050908 A | | 5/2017 | |
| KR | 10-2019-0098981 A | | 8/2019 | |
| KR | 10-2199158 B1 | | 1/2021 | |
| WO | WO-2019160070 A1 | * | 8/2019 | ........... G01S 3/8083 |
| WO | WO-2021041623 A1 | * | 3/2021 | ........... G10L 19/008 |

OTHER PUBLICATIONS

Kim, Jinsung, et al. "Fault Detection in a Microphone Array by Intercorrelation of Features in Voice Activity Detection." *IEEE Transactions on Industrial Electronics* vol. 58 Issue 6 Jun. 2010 (4 pages in English).

Kirichenko, Polina, et al. "Why Normalizing Flows Fail to Detect Out-of-Distribution Data." *Advances in neural information processing systems* vol. 33 arXiv:2006.08545v1 Jun. 15, 2020 (27 pages in English).

\* cited by examiner

METHOD AND APPARATUS WITH ABNORMAL CHANNEL OF MICROPHONE ARRAY DETECTION AND COMPENSATION SIGNAL GENERATION

CROSS-REFERENCE TO RELATED APPLICATIONS

This application claims the benefit under 35 USC § 119(a) of Korean Patent Application No. 10-2021-0132102, filed on Oct. 6, 2021 in the Korean Intellectual Property Office, the entire disclosure of which is incorporated herein by reference for all purposes.

BACKGROUND

1. Field

The following description relates to a method and apparatus with abnormal channel of a microphone array detection and compensation signal generation.

2. Description of Related Art

Many voice-related systems (e.g., TVs, computers, voice recognition devices, video cameras, etc.) need to receive only desired signals to implement their respective functions. However, various signals other than the desired signals may be generated in an environment where noise or reverberation occurs, and such signals are received together by a microphone configured to receive desired signals. One technique to eliminate noise or reverberation is a microphone array in which a plurality of microphones are connected to have a directional property.

A typical method and apparatus may not use an integrated model to detect failure signals for microphones included in a microphone array.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes: receiving multi-channel sound source signals from a microphone array; synchronizing the multi-channel sound source signals based on spatial information of the microphone array; and detecting an abnormal channel of the microphone array by inputting the synchronized sound source signals and first conditional information to a neural network model configured to perform an inverse operation.

The method may include generating a compensation signal corresponding to the abnormal channel using the neural network model in response to the abnormal channel being detected.

The method may include determining a sound source signal of a reference channel of the microphone array from among the multi-channel sound source signals; and determining the sound source signal of the reference channel to be the first conditional information.

The synchronizing further may include shifting the multi-channel sound source signals based on the sound source signal of the reference channel.

The detecting of the abnormal channel may include: determining an output vector by inputting the synchronized sound source signals and the first conditional information to the neural network model; determining a probability value corresponding to the output vector; and detecting the abnormal channel of the microphone array by comparing the probability value to a threshold.

The spatial information of the microphone array may include either one or both of shape information of the microphone array and distance information between channels included in the microphone array.

The generating of the compensation signal may include: sampling an arbitrary vector in a probability distribution corresponding to an output of the neural network model; generating an intermediate compensation signal by inputting the arbitrary vector and second conditional information to the neural network model; and generating, as the compensation signal, a final compensation signal by shifting the intermediate compensation signal based on the spatial information of the microphone array.

The second conditional information may include a sound source signal corresponding to one of the channels other than the abnormal channel.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus includes: one or more processor configured to:
receive multi-channel sound source signals from a microphone array; synchronize the multi-channel sound source signals based on spatial information of the microphone array; and detect an abnormal channel of the microphone array by inputting the synchronized sound source signals and first conditional information to a neural network model configured to perform an inverse operation.

The one or more processors may be configured to generate a compensation signal corresponding to the abnormal channel using the neural network model in response to the abnormal channel being detected.

The one or more processors may be configured to: determine a sound source signal of a reference channel of the microphone array from among the multi-channel sound source signals; and determine the sound source signal of the reference channel to be the first conditional information.

For the synchronizing, the one or more processors may be configured to shift the multi-channel sound source signals based on the sound source signal of the reference channel.

For the detecting of the abnormal channel, the one or more processors may be configured to: determine an output vector by inputting the synchronized sound source signals and the first conditional information to the neural network model; determine a probability value corresponding to the output vector; and detect the abnormal channel of the microphone array by comparing the probability value to a threshold.

The spatial information of the microphone array may include either one or both of shape information of the microphone array and distance information between channels included in the microphone array.

For the generating of the compensation signal, the one or more processors may be configured to: sample an arbitrary vector in a probability distribution corresponding to an output of the neural network model; generate an intermediate compensation signal by inputting the arbitrary vector and second conditional information to the neural network model; and generate, as the compensation signal, a final compensation signal by shifting the intermediate compensation signal based on the spatial information of the microphone array.

The second conditional information may include a sound source signal corresponding to one of the channels other than the abnormal channel.

In another general aspect, an electronic device includes: a microphone array configured to receive multi-channel sound source signals; and one or more processors configured to: synchronize the multi-channel sound source signals based on spatial information of the microphone array; and detect an abnormal channel of the microphone array by inputting the synchronized sound source signals and first conditional information to a neural network model configured to perform an inverse operation.

The one or more processors may be configured to generate a compensation signal corresponding to the abnormal channel using the neural network model in response to the abnormal channel being detected.

In another general aspect, a method includes: sampling an arbitrary vector in a probability distribution corresponding to an output of a neural network model configured to perform an inverse operation; generating an intermediate compensation signal by inputting the arbitrary vector and second conditional information to the neural network model; and generating a compensation signal corresponding to a detected abnormal channel of a microphone array by shifting the intermediate compensation signal based on spatial information of the microphone array.

The method may include receiving multi-channel sound source signals from the microphone array; synchronizing the multi-channel sound source signals based on the spatial information; and detecting the abnormal channel by inputting the synchronized sound source signals and first conditional information to the neural network model.

The synchronizing further may include: determining delay times among the channels of the microphone array based on the spatial information of the microphone array; and synchronizing the multi-channel sound source signals by shifting the multi-channel sound source signals based on the delay times.

The spatial information of the microphone array may include information of an angle formed by the microphone array.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first," "second," and the like are used to explain various members, components, regions, layers, or sections, these members, components, regions, layers, or sections are not limited to the terms. Rather, these terms should be used only to distinguish one member, component, region, layer, or section from another member, component, region, layer, or section. For example, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meaning as commonly understood by one of ordinary skill in the art to which this disclosure pertains after and understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

The examples may be implemented as various types of products, such as, for example, a personal computer (PC), a laptop computer, a tablet computer, a smartphone, a television (TV), a smart home appliance, an intelligent vehicle, a kiosk, and a wearable device. Hereinafter, examples will be described in detail with reference to the accompanying drawings. In the drawings, like reference numerals are used for like elements.

Figure 1:
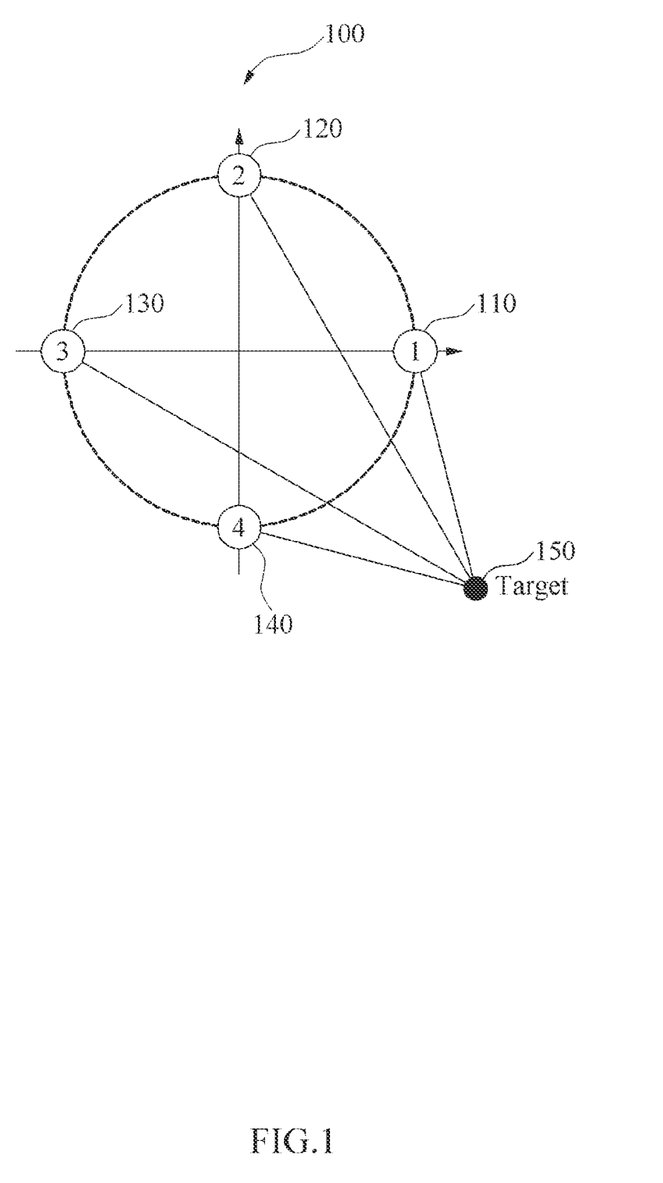
FIG. 1 illustrates an example of an operating method of a microphone array.

FIG. 1 illustrates an example of an operating method of a microphone array.

Referring to FIG. 1, a microphone array 100 may include a plurality of microphone sensors installed at equal or non-equal intervals to input a sound source 150. For example, the microphone array 100 may include a first microphone sensor 110, a second microphone sensor 120, a third microphone sensor 130, and a fourth microphone sensor 140 installed at equal intervals. However, the microphone array 100 shown in FIG. 1 is merely an example, and the structure of the microphone array 100 including the microphones may be modified in various manners.

Herein, a microphone sensor refers to a device that receives a sound source in the form of sound energy and converts the sound source into a sound source signal in the form of electric energy corresponding to the sound source. The microphone sensors included in the microphone array may be referred to as channels of the microphone array. For example, the microphone array 100 may be construed as including four channels.

The microphone array 100 may include a plurality of microphone sensors, thereby producing various effects. For example, the microphone array 100 may selectively receive only a signal from a desired direction and remove a sound source from an undesired direction, and may also remove noise incident from a different direction using a directional property of the sound source.

However, in order for the microphone array 100 to accurately produce the effects described above, it may be important that all the channels of the microphone array 100 operate normally. For example, when any channel(s) of the microphone array 100 does not operate normally, the microphone array 100 may not accurately perform a desired operation.

Therefore, in a sound system using a plurality of microphone sensors, a method and apparatus of one or more embodiments may quickly identify a microphone sensor showing abnormality and further compensate for an output of an abnormal microphone sensor, thereby improving the technological fields of voice-related systems and compensation signal generation. In particular, in the case of a microphone array, the method and apparatus of one or more embodiments may consider spatial characteristics between a plurality of microphone sensors included in the microphone array.

As described in detail below, a method of detecting an abnormal channel of a microphone array and generating a compensation signal of one or more embodiments may quickly detect a faulty channel of a microphone array by using a deep learning-based artificial neural network model and generate a compensation signal for the faulty channel.

Figure 2:
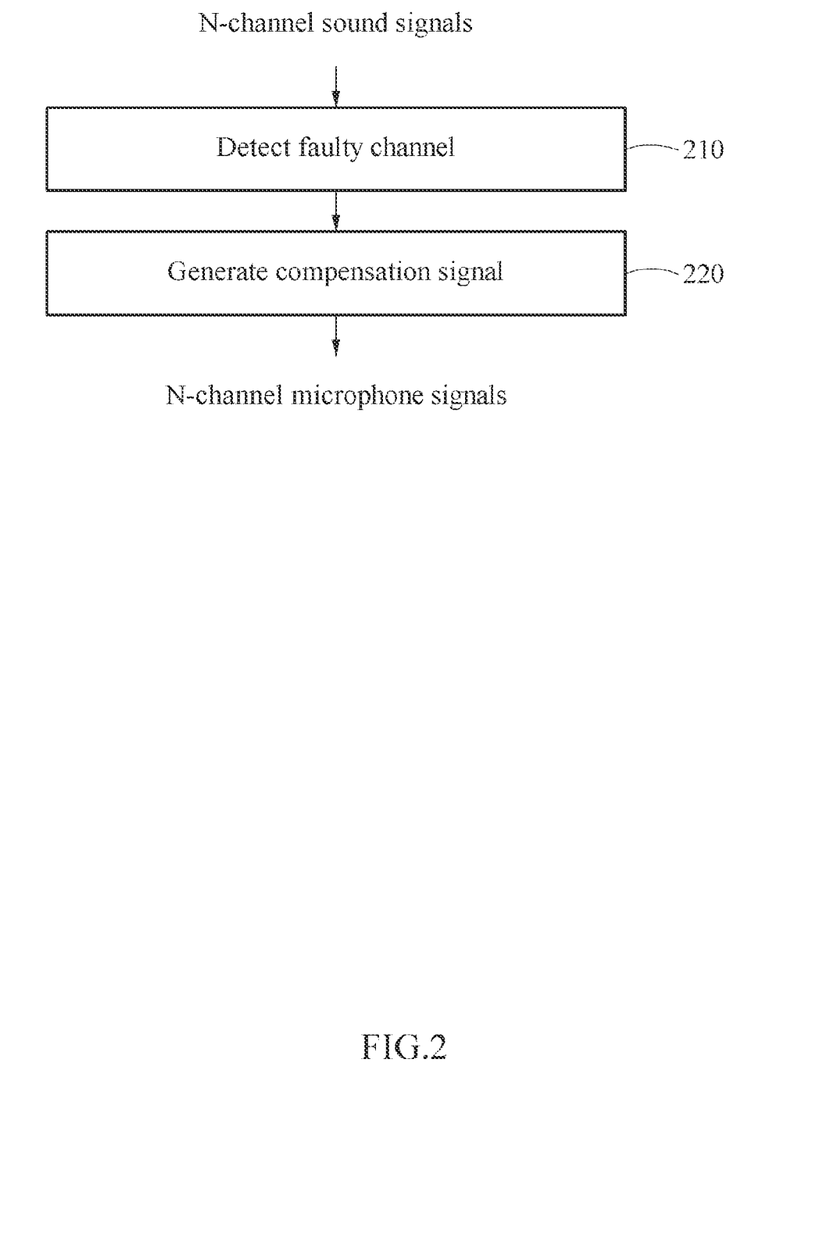
FIG. 2 illustrates an example of a method of detecting an abnormal channel of a microphone array and generating a compensation signal.

FIG. 2 illustrates an example of a method of detecting an abnormal channel of a microphone array and generating a compensation signal. Operations 210 and 220 of FIG. 2 may be performed by an apparatus for detecting an abnormal channel of a microphone array and generating a compensation signal of one or more embodiments (hereinafter, the detection apparatus).

Furthermore, the operations of FIG. 2 may be performed in the shown order and manner. However, the order of some operations may be changed, or some operations may be omitted, without departing from the spirit and scope of the shown example. The operations shown in FIG. 2 may be performed in parallel or simultaneously.

Referring to FIG. 2, the method of detecting an abnormal channel of a microphone array and generating a compensation signal may include operation 210 of detecting a faulty channel and operation 220 of generating a compensation signal.

More specifically, in operation 210, the detection apparatus may receive sound source signals corresponding to a plurality of channels (e.g., N channels) and detect a faulty channel. For example, a microphone array may convert, for each channel, a sound source in the form of sound energy into a sound source signal in the form of electric energy, and the detection apparatus may receive sound source signals corresponding to a plurality of channels from the microphone array. Furthermore, the detection apparatus may detect a faulty channel by driving (e.g., implementing) an artificial neural network model trained to detect an abnormal channel.

In operation 220, in response to an abnormal channel being detected, the detection apparatus may generate a compensation signal corresponding to the detected abnormal channel using an artificial neural network. The artificial neural network may perform an inverse operation. Accordingly, the detection apparatus may generate the compensation signal using the artificial neural network used in operation 210 to detect the abnormal channel.

Hereinafter, a non-limiting example of the artificial neural network model that performs the inverse operation will be described in detail with reference to FIG. 3. A non-limiting example of operation 210 will be described in detail with reference to FIGS. 4 and 5. A non-limiting example of operation 220 will be described in detail with reference to FIGS. 6 and 7.

Figure 3:
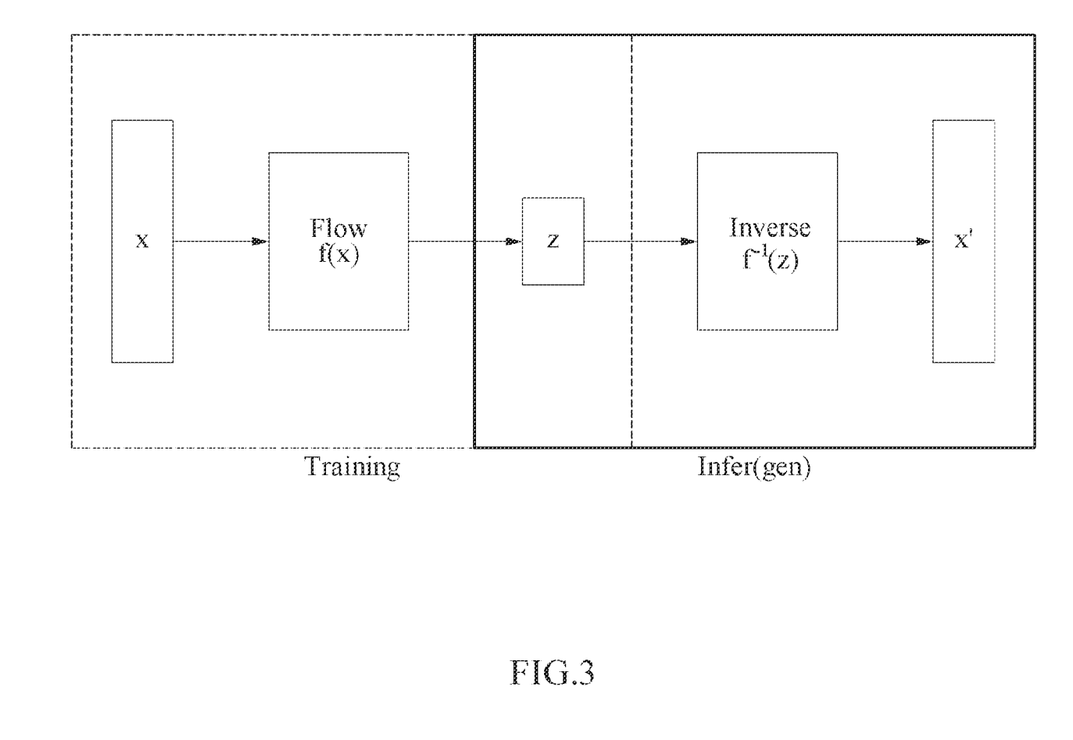
FIG. 3 illustrates an example of an artificial neural network model performing an inverse operation.

FIG. 3 illustrates an example of an artificial neural network model performing an inverse operation.

An artificial neural network may include an input layer, an output layer, and optionally, one or more hidden layers. Each layer may include one or more nodes, and the artificial neural network may include nodes and connections connecting the nodes. Each node in the artificial neural network may output a function value of an activation function for input signals, weights, and biases input through the synapses. While the neural network may be referred to as an "artificial" neural network, such reference is not intended to impart any relatedness with respect to how the neural network computationally maps or thereby intuitively recognizes information and how a biological brain operates. I.e., the term "artificial neural network" is merely a term of art referring to the hardware-implemented neural network.

A model parameter may be determined through training and may include a weight of a connection or a bias of a node. In addition, a hyperparameter may be a parameter that is set before training in a machine learning algorithm and may include any one or more or all of a learning rate, a number of repetitions, a mini-batch size, an initialization function, and the like.

The artificial neural network may perform training for a desired task, and build an inference model. In addition, the artificial neural network may output an inference result associated with an external input value based on the built inference model.

The artificial neural network may be trained to determine a model parameter minimizing a loss function. The loss function may be used as an index to determine an optimal model parameter in the process of training the artificial neural network.

An operation of generating an artificial neural network, training the artificial neural network, or re-training the artificial neural network may be performed by a separate computing device (hereinafter, the training device), or by the detection apparatus. The training operation may be performed by various types of computing devices, for example, a personal computer (PC), a server device, a mobile device, and the like. The training device may use previously prepared training data or training data collected from one or more users. In addition, the training device may use training data generated by a simulation.

The computing device may transmit the trained artificial neural network to the detection apparatus described above with reference to FIG. 1, or the detection apparatus may train the artificial neural network and generate the trained artificial neural network. The detection apparatus may be or be included in a mobile device, an embedded device, or the like. The detection apparatus may be dedicated hardware for driving an artificial neural network. The detection apparatus may drive the trained artificial neural network as it is, or may drive a processed (e.g., quantized) artificial neural network. The detection apparatus and the training device may be implemented in separate and independent devices. However, examples are not limited thereto, and the detection apparatus and the training device may be implemented in the same device.

Referring to FIG. 3, an artificial neural network model may perform an operation based on the artificial neural network, and may be, for example, a flow-based generative model.

The flow-based generative model may explicitly learn a distribution of data x through a sequence of invertible transformations on a probability distribution of a latent vector z. The flow-based generative model may learn $z=f(x)$ to calculate the latent variable z that may express a high-dimensional variable x well, but may calculate x again (e.g., x') through an inverse function $f^{-1}$ of f and solve this with a negative log-likelihood (NLL).

Figure 4:
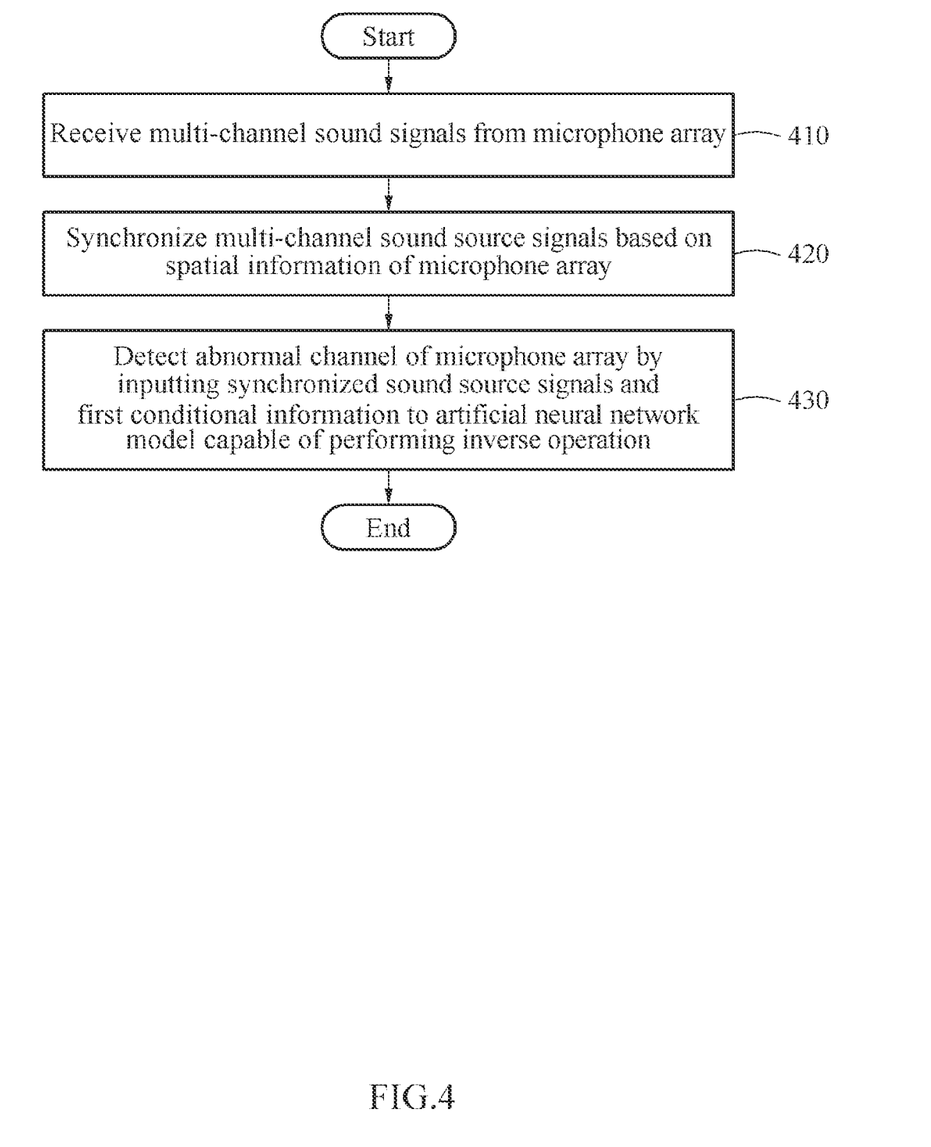
FIGS. 4 and 5 illustrate an example of a method of detecting an abnormal channel.
Figure 5:
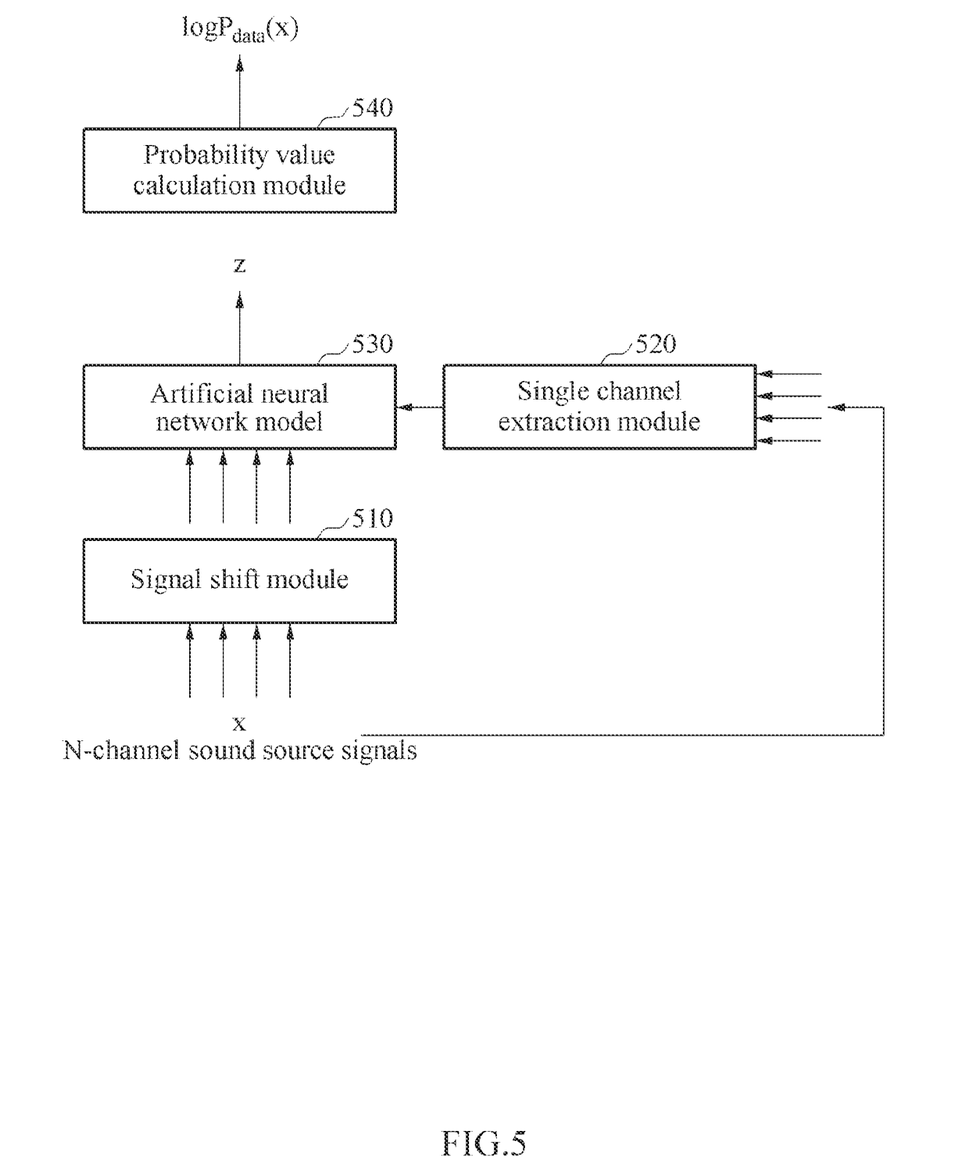

FIGS. 4 and 5 illustrate an example of a method of detecting an abnormal channel.

Referring to FIG. 4, operations 410 to 430 may be performed by the detection apparatus described above with reference to FIG. 2. The description of FIGS. 1 to 3 may also apply to the example of FIG. 4, and thus a duplicated description will be omitted.

Furthermore, the operations of FIG. 4 may be performed in the shown order and manner. However, the order of some operations may be changed, or some operations may be omitted, without departing from the spirit and scope of the shown example. The operations shown in FIG. 4 may be performed in parallel or simultaneously.

In operation 410, the detection apparatus receives multi-channel sound source signals from a microphone array.

In operation 420, the detection apparatus may synchronize the multi-channel sound source signals based on spatial information of the microphone array. The spatial information of the microphone array may include either one or both of shape information of the microphone array and distance information between a plurality of microphone sensors included in the microphone array. The shape information of the microphone array may refer to an angle formed by the microphone array.

The detection apparatus may calculate delay times among the microphone sensors based on the spatial information of the microphone array. The detection apparatus may synchronize the multi-channel sound source signals by shifting the multi-channel sound source signals based on the delay times. In response to such data processing, the artificial neural network model may learn a data distribution reflecting the spatial information of the microphone array.

In operation 430, the detection apparatus may detect an abnormal channel of the microphone array by inputting the synchronized sound source signals and first conditional information to an artificial neural network model configured to perform an inverse operation. The artificial neural network model may be the artificial neural network model described with reference to FIG. 3.

To train the artificial neural network model such that vectors z, which are an output of the artificial neural network model, follow a predetermined probability distribution (e.g., a normal distribution), the training device may calculate a value log $P_{data}(x)$ and train the artificial neural network model to maximize the value. The training device may use the first conditional information to better train the artificial neural network model. The first conditional information may be a single-channel sound source signal.

The detection apparatus may calculate probability values (log $P_{data}(x)$ values) for the synchronized sound source signals input to the trained artificial neural network. When a faulty signal, which is data different from the distribution of previously learned data, is input, a low probability value (log $P_{data}(x)$ value) may be output, and when a normal signal is input, a high probability value (log $P_{data}(x)$ value) may be output.

That is, when a microphone operates normally, the probability values (log $P_{data}(x)$ values) corresponding to all the synchronized sound source signals may be greater than or equal to a predetermined threshold. However, when a predetermined microphone sensor is faulty, a probability value (log $P_{data}(x)$ value) corresponding to the faulty microphone sensor may be less than the predetermined threshold.

Referring to FIG. 5, the detection apparatus may include a signal shift module 510, a single channel extraction module 520, an artificial neural network model 530, and a probability value calculation module 540.

The elements of the detection apparatus shown in FIG. 5 are separately illustrated to indicate that the elements may be separated functionally and logically, which, however, does not indicate that the elements are necessarily physically separated elements or are implemented by separate codes. The description of FIGS. 1 to 4 may also apply to the example of FIG. 5, and thus a duplicated description will be omitted.

The signal shift module 510 may synchronize multi-channel sound source signals by shifting the multi-channel sound source signals based on a reference sound source signal of a reference microphone sensor.

The single channel extraction module 520 may extract sound source signals of the reference microphone sensor from the multi-channel sound source signals. The sound source signals of the reference microphone sensor may be used as a first conditional signal (or first conditional information) for the artificial neural network model 530.

The artificial neural network model 530 may receive the synchronized sound source signals and the first conditional information, and output output vectors for the synchronized sound source signals.

The probability value calculation module 540 may determine probability values corresponding to the output vectors, and the detection apparatus may detect an abnormal channel of the microphone array by comparing the probability values to a threshold.

The detection apparatus may repeat the operations of FIG. 5 described above by changing the reference microphone sensor. For example, when a microphone array has four channels, the detection apparatus may detect an abnormal channel of the microphone array using a sound source signal of a first channel as the first conditional signal, and detect an abnormal channel of the microphone array using a sound source signal of a second channel as the first conditional signal again. Furthermore, for third and fourth channels as well, the detection apparatus may detect an abnormal channel of the microphone array in the same manner.

Figure 6:
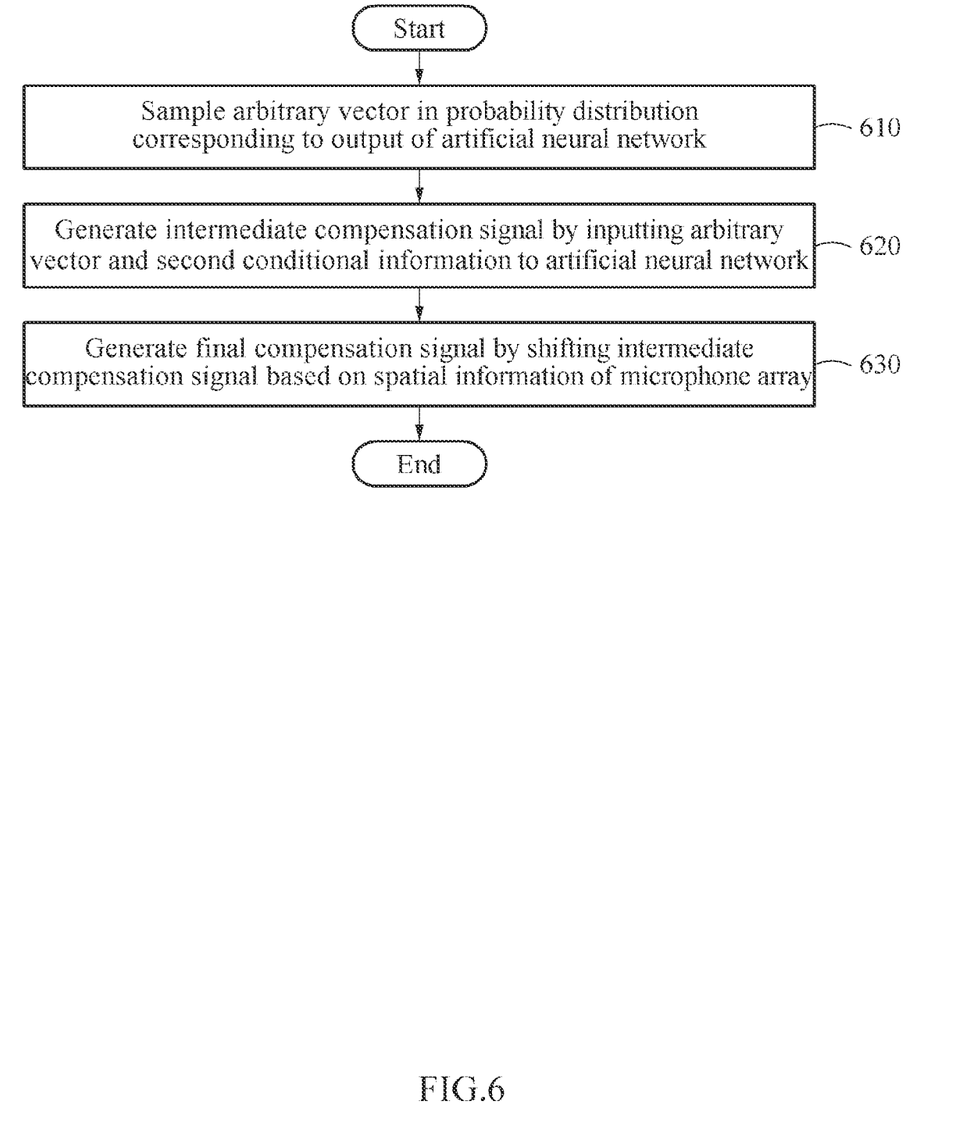
FIGS. 6 and 7 illustrate an example of a method of generating a compensation signal.
Figure 7:
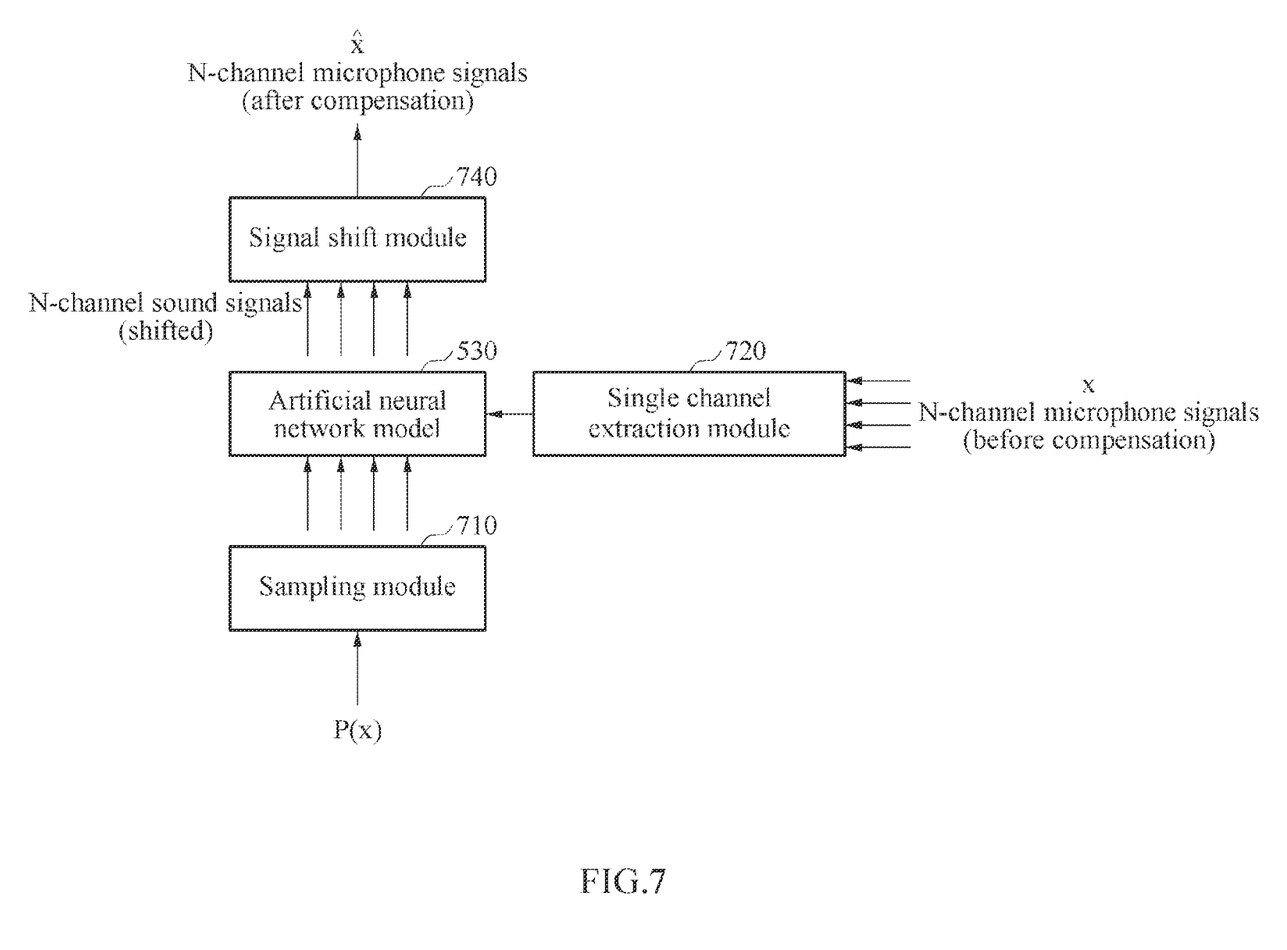

FIGS. 6 and 7 illustrate an example of a method of generating a compensation signal.

Referring to FIG. 6, operations 610 to 630 may be performed by the detection apparatus described above with reference to FIG. 2. The description of FIGS. 1 to 5 may also apply to the example of FIG. 6, and thus a duplicated description will be omitted.

Furthermore, the operations of FIG. 6 may be performed in the shown order and manner. However, the order of some operations may be changed, or some operations may be omitted, without departing from the spirit and scope of the shown example. The operations shown in FIG. 6 may be performed in parallel or simultaneously.

The detection apparatus may generate, in response to an abnormal channel being detected, a compensation signal corresponding to the abnormal channel using the artificial neural network used to detect the abnormal channel.

In operation 610, the detection apparatus may sample an arbitrary vector in a probability distribution corresponding to an output of the artificial neural network.

In operation 620, the detection apparatus may generate an intermediate compensation signal by inputting the arbitrary vector and second conditional information to the artificial neural network. The detection apparatus may generate a signal following a distribution of the sound source signal used for training through a vector z that is randomly sampled in a previously determined probability distribution.

At this time, a normal signal is to be input as a single-channel microphone signal, which is the second conditional information for the artificial neural network model. For example, a sound source signal of an arbitrary microphone sensor corresponding to one of the channels other than a faulty channel detected during the fault detection process may be input.

In operation 630, the detection apparatus may generate a final compensation signal by shifting the intermediate compensation signal based on spatial information of the microphone array. Since the compensation signal output from the artificial neural network model is a shifted signal, the detection apparatus may generate the final compensation signal by performing an inverse shift operation based on the microphone sensor to which the second conditional information is input.

Referring to FIG. 7, the detection apparatus may include a sampling module 710, a single channel extraction module 720, the artificial neural network model 530, and a signal shift module 740, wherein the single channel extraction module 720 and the signal shift module 740 may be the single channel extraction module 520 and the signal shift module 510 of FIG. 5, respectively.

The elements of the detection apparatus shown in FIG. 7 are separately illustrated to indicate that the elements may be separated functionally and logically, which, however, does not indicate that the elements are necessarily physically separated elements or are implemented by separate codes. The description of FIGS. 1 to 6 may also apply to the example of FIG. 7, and thus a duplicated description will be omitted.

The sampling module 710 may generate a signal following a distribution of the sound source signal used for training through a vector z that is randomly sampled in a previously determined probability distribution.

The single channel extraction module 720 may extract a sound source signal of an arbitrary microphone sensor corresponding to one of the channels other than a faulty channel detected during the fault detection process.

The artificial neural network model 530 may be an artificial neural network model that performs an inverse operation, and may generate an intermediate compensation signal by receiving an arbitrary vector and second conditional information.

The signal shift module 740 may generate a final compensation signal by shifting the intermediate compensation signal based on spatial information of the microphone array.

Figure 8:
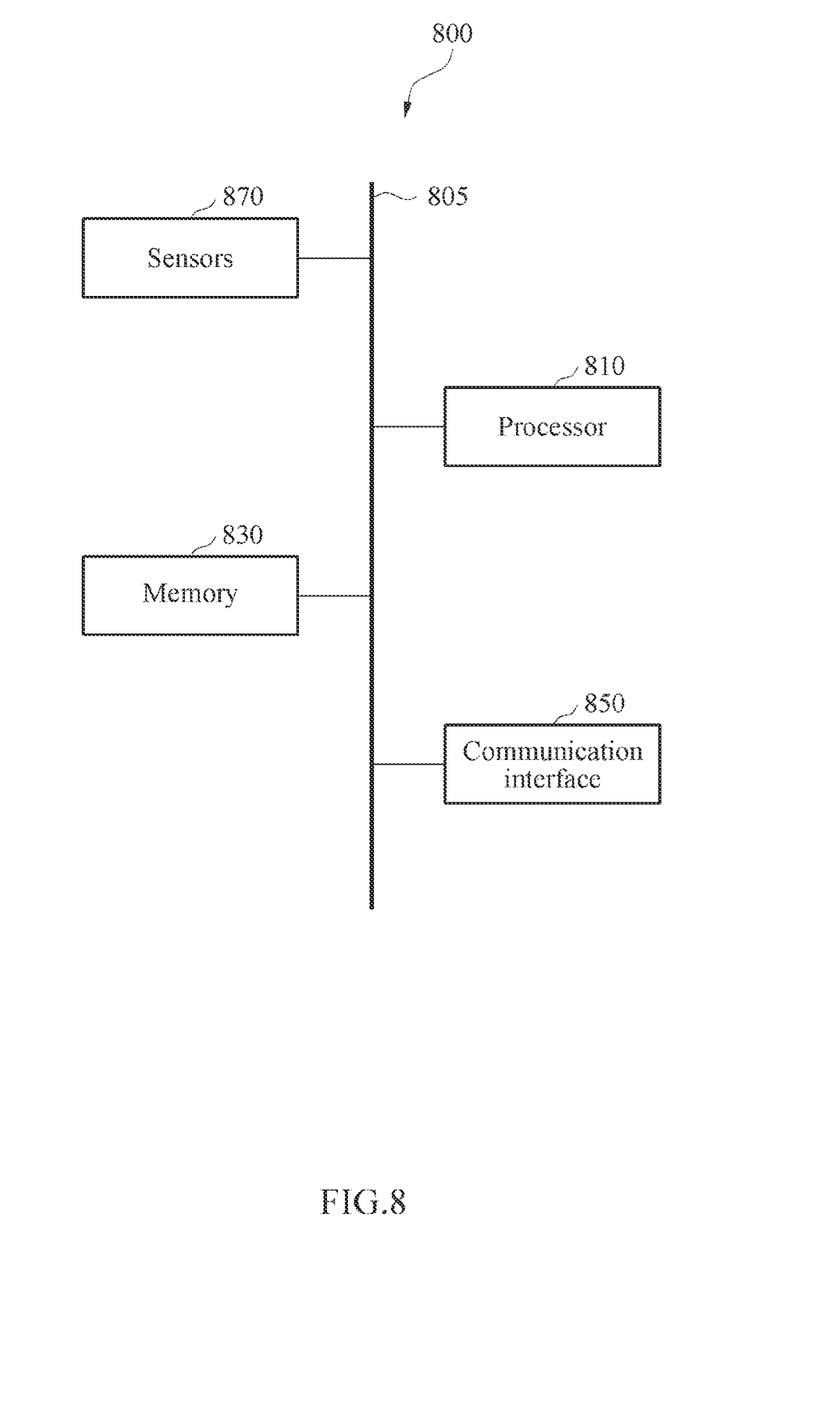
FIG. 8 illustrates an example of an electronic device.

FIG. 8 illustrates an example of an electronic device.

Referring to FIG. 8, an electronic device 800 may include a processor 810 (e.g., one or more processors), a memory 830 (e.g., one or more memories), a communication interface 850, and sensors 870 (e.g., a microphone array such as the microphone array 100 of FIG. 1). The processor 810, the memory 830, the communication interface 850, and the sensors 870 may communicate with each other through a communication bus 805. The electronic device 800 may be or include the detection apparatus described above with reference to FIGS. 1 to 7.

The processor 810 may synchronize multi-channel sound source signals based on spatial information of the microphone array, and detect an abnormal channel of the microphone array by inputting the synchronized sound source signals and first conditional information to an artificial neural network model that performs an inverse operation. Furthermore, in response to an abnormal channel being detected, the processor 810 may generate a compensation signal corresponding to the abnormal channel using the artificial neural network. The processor 810 may include one or more or all components of the detection apparatus described above with reference to FIGS. 1 to 7.

The memory 830 may be a volatile memory or a non-volatile memory, and the processor 810 may execute a program and control the electronic device 800. Program codes to be executed by the processor 810 may be stored in the memory 830. The electronic device 800 may be connected to an external device (e.g., a PC or a network) through an input/output device (not shown) to exchange data therewith. The electronic device 800 may be mounted on various computing devices and/or systems such as a smartphone, a tablet computer, a laptop computer, a desktop computer, a television, a wearable device, a security system, a smart home system, and the like.

The detection apparatuses, microphone arrays, first microphone sensors, second microphone sensors, third microphone sensors, fourth microphone sensors, signal shift modules, single channel extraction modules, artificial neural network models, probability value calculation modules, sampling modules, electronic devices, processors, memories, communication interfaces, communication buses, microphone array 100, first microphone sensor 110, second microphone sensor 120, third microphone sensor 130, fourth microphone sensor 140, signal shift module 510, single channel extraction module 520, artificial neural network model 530, probability value calculation module 540, sampling module 710, single channel extraction module 720, signal shift module 740, electronic device 800, processor 810, memory 830, communication interface 850, sensors 870, communication bus 805, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method, comprising:
  receiving multi-channel sound source signals from a microphone array;
  synchronizing the multi-channel sound source signals based on spatial information of the microphone array; and
  detecting an abnormal channel of the microphone array by inputting the synchronized sound source signals and first conditional information to a neural network model configured to perform an inverse operation, further including generating an intermediate compensation signal by inputting sampled data, sampled from an output of the neural network, and second conditional information to the neural network model and shifting the intermediate compensation signal based on the spatial information of the microphone array.

2. The method of claim 1, further comprising:
  generating a compensation signal corresponding to the abnormal channel using the neural network model in response to the abnormal channel being detected.

3. The method of claim 1, further comprising:
  determining a sound source signal of a reference channel of the microphone array from among the multi-channel sound source signals; and
  determining the sound source signal of the reference channel to be the first conditional information.

4. The method of claim 3, wherein the synchronizing further comprises shifting the multi-channel sound source signals based on the sound source signal of the reference channel.

5. The method of claim 1, wherein the detecting of the abnormal channel comprises:
  determining an output vector by inputting the synchronized sound source signals and the first conditional information to the neural network model;
  determining a probability value corresponding to the output vector; and
  detecting the abnormal channel of the microphone array by comparing the probability value to a threshold.

6. The method of claim 1, wherein the spatial information of the microphone array comprises either one or both of shape information of the microphone array and distance information between channels included in the microphone array.

7. The method of claim 2, wherein the generating of the compensation signal comprises:
  sampling an arbitrary vector in a probability distribution corresponding to the output of the neural network model;
  generating the intermediate compensation signal by inputting the arbitrary vector and the second conditional information to the neural network model; and
  generating, as the compensation signal, a final compensation signal by shifting the intermediate compensation signal based on the spatial information of the microphone array.

8. The method of claim 7, wherein the second conditional information comprises a sound source signal corresponding to one of the channels other than the abnormal channel.

9. A non-transitory computer-readable storage medium storing instructions that, when executed by one or more processors, configure the one or more processors to perform the method of claim 1.

10. An apparatus, comprising:
  one or more processors configured to:
    receive multi-channel sound source signals from a microphone array;
    synchronize the multi-channel sound source signals based on spatial information of the microphone array; and
    detect an abnormal channel of the microphone array by inputting the synchronized sound source signals and first conditional information to a neural network model configured to perform an inverse operation, further including generating an intermediate compensation signal by inputting sampled data, sampled from an output of the neural network model, and second conditional information to the neural network model and shifting the intermediate compensation signal based on the spatial information of the microphone array.

11. The apparatus of claim 10, wherein the one or more processors are further configured to generate a compensation signal corresponding to the abnormal channel using the neural network model in response to the abnormal channel being detected.

12. The apparatus of claim 10, wherein the one or more processors are further configured to:
  determine a sound source signal of a reference channel of the microphone array from among the multi-channel sound source signals; and
  determine the sound source signal of the reference channel to be the first conditional information.

13. The apparatus of claim 12, wherein, for the synchronizing, the one or more processors are further configured to shift the multi-channel sound source signals based on the sound source signal of the reference channel.

14. The apparatus of claim 10, wherein, for the detecting of the abnormal channel, the one or more processors are further configured to:
  determine an output vector by inputting the synchronized sound source signals and the first conditional information to the neural network model;
  determine a probability value corresponding to the output vector; and
  detect the abnormal channel of the microphone array by comparing the probability value to a threshold.

15. The apparatus of claim 10, wherein the spatial information of the microphone array comprises either one or both of shape information of the microphone array and distance information between channels included in the microphone array.

16. The apparatus of claim 11, wherein, for the generating of the compensation signal, the one or more processors are further configured to:
sample an arbitrary vector in a probability distribution corresponding to an output of the neural network model;
generate an intermediate compensation signal by inputting the arbitrary vector and second conditional information to the neural network model; and
generate, as the compensation signal, a final compensation signal by shifting the intermediate compensation signal based on the spatial information of the microphone array.

17. The apparatus of claim 16, wherein the second conditional information comprises a sound source signal corresponding to one of the channels other than the abnormal channel.

18. An electronic device, comprising:
a microphone array configured to receive multi-channel sound source signals; and
one or more processors configured to:
synchronize the multi-channel sound source signals based on spatial information of the microphone array; and
detect an abnormal channel of the microphone array by inputting the synchronized sound source signals and first conditional information to a neural network model configured to perform an inverse operation, further including generating an intermediate compensation signal by inputting sampled data, sampled from an output of the neural network model, and second conditional information to the neural network model and shifting the intermediate compensation signal based on the spatial information of the microphone array.

19. The electronic device of claim 18, wherein the one or more processors are further configured to generate a compensation signal corresponding to the abnormal channel using the neural network model in response to the abnormal channel being detected.

20. A method, comprising:
sampling an arbitrary vector in a probability distribution corresponding to an output of a neural network model configured to perform an inverse operation;
generating an intermediate compensation signal by inputting the arbitrary vector and first conditional information to the neural network model; and
generating a compensation signal corresponding to a detected abnormal channel of a microphone array by shifting the intermediate compensation signal based on spatial information of the microphone array.

21. The method of claim 20, further comprising:
receiving multi-channel sound source signals from the microphone array;
synchronizing the multi-channel sound source signals based on the spatial information; and
detecting the abnormal channel by inputting the synchronized sound source signals and second conditional information to the neural network model.

22. The method of claim 21, wherein the synchronizing further comprises:
determining delay times among the channels of the microphone array based on the spatial information of the microphone array; and
synchronizing the multi-channel sound source signals by shifting the multi-channel sound source signals based on the delay times.

23. The method of claim 20, wherein the spatial information of the microphone array comprises information of an angle formed by the microphone array.

\* \* \* \* \*